United States Patent
Chauhan et al.

(10) Patent No.: US 12,130,823 B2
(45) Date of Patent: Oct. 29, 2024

(54) PROVIDING DYNAMICALLY CUSTOMIZED RANKINGS OF GAME ITEMS

(71) Applicant: Roblox Corporation, San Mateo, CA (US)

(72) Inventors: Sejal Chauhan, San Jose, CA (US); Aswath Manoharan, Sunnyvale, CA (US); Nikolaus Sonntag, Foster City, CA (US); Eric Holmdahl, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 329 days.

(21) Appl. No.: 17/008,732

(22) Filed: Sep. 1, 2020

(65) Prior Publication Data

US 2022/0067052 A1    Mar. 3, 2022

(51) Int. Cl.
| | |
|---|---|
| *G06F 16/00* | (2019.01) |
| *A63F 13/79* | (2014.01) |
| *G06F 16/2457* | (2019.01) |
| *G06F 16/28* | (2019.01) |
| *G06N 20/00* | (2019.01) |

(52) U.S. Cl.
CPC ........ *G06F 16/24578* (2019.01); *A63F 13/79* (2014.09); *G06F 16/285* (2019.01); *G06N 20/00* (2019.01); *A63F 2300/5546* (2013.01)

(58) Field of Classification Search
CPC ............ G06F 16/24578; G06F 16/285; G06F 16/9536; A63F 13/79; A63F 2300/5546; G06N 20/00; G06N 3/08

USPC ........................................... 706/11, 600–899
See application file for complete search history.

(56) References Cited

U.S. PATENT DOCUMENTS

| | | |
|---|---|---|
| 2008/0114750 A1 | 5/2008 | Saxena et al. |
| 2008/0220876 A1 | 9/2008 | Mehta et al. |
| 2009/0006360 A1* | 1/2009 | Liao ...................... G06F 16/284 707/999.005 |
| 2015/0112918 A1* | 4/2015 | Zheng .................... G06N 5/047 706/48 |
| 2017/0024663 A1 | 1/2017 | Liu |

(Continued)

OTHER PUBLICATIONS

WIPO, International Search Report for International Patent Application No. PCT/US2021/047287, Dec. 13, 2021, 2 pages.

(Continued)

*Primary Examiner* — Irete F Ehichioya
*Assistant Examiner* — Shirley D Hicks
(74) *Attorney, Agent, or Firm* — IP Spring

(57) ABSTRACT

Implementations described herein relate to methods, systems, and computer-readable media to dynamically customize rankings. In some implementations, a method includes receiving, from a user, a request for a list of items available on an online gaming platform, identifying a particular trained machine learning model based at least in part on user data associated with the user, providing an input feature vector to the particular trained machine learning model, obtaining an output feature vector from the particular trained machine learning model, assigning a rank for each of the plurality of items based on the output feature vector, generating the list of items, wherein items in the list of items are ordered based on respective ranks, and providing a user interface to the user that includes the list of items.

20 Claims, 6 Drawing Sheets

(56) References Cited

U.S. PATENT DOCUMENTS

| | | |
|---|---|---|
| 2017/0161640 A1 | 6/2017 | Shamir |
| 2019/0378050 A1 | 12/2019 | Edkin et al. |
| 2019/0388789 A1* | 12/2019 | Aghdaie ................ G06Q 10/04 |
| 2021/0122045 A1* | 4/2021 | Handa ....................... G06T 7/74 |

OTHER PUBLICATIONS

WIPO, Written Opinion for International Patent Application No. PCT/US2021/047287, Dec. 13, 2021, 6 pages.

* cited by examiner

PROVIDING DYNAMICALLY CUSTOMIZED RANKINGS OF GAME ITEMS

TECHNICAL FIELD

Embodiments relate generally to computer-based gaming, and more particularly, to methods, systems, and computer readable media to provide dynamically customized rankings of items in search results.

BACKGROUND

Some online gaming platforms allow users to access content such as games and game assets, connect with each other, interact with each other (e.g., within a game), and share information with each other via the Internet. Users of online gaming platforms may participate in multiplayer gaming environments in which games or parts of games have been provided for interaction and/or purchase.

When users search through for game-related content (e.g., games, items for games, accessories for avatars, etc.) or other content, a search engine may return search results based on factors such as popularity in terms of numbers of downloads by users, rating by users, etc. However, such search engines may provide many search results that are organized based on collective preferences or data based on a large volume of users. This can confuse and frustrate users who receive results that are not suited to their personal preferences or gaming style.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to display of search results with dynamically customized rankings of items. In some implementations, a method includes receiving, from a user, a request for a list of items available on an online gaming platform; identifying a particular trained machine learning model from a plurality of trained machine learning models based at least in part on user data associated with the user; providing an input feature vector to the particular trained machine learning model, wherein the input feature vector includes a plurality of feature values for each item of a plurality of items; obtaining an output feature vector from the particular trained machine learning model, wherein the output feature vector includes a modified feature value for each of the plurality of feature values for each item; assigning a rank for each of the plurality of items based on the output feature vector; generating the list of items, wherein items in the list of items are ordered based on respective ranks; and providing a user interface to the user that includes the list of items.

Various implementations and examples of the method are described. For example, in some implementations, each model of the plurality of trained machine learning models is associated with a respective cluster, and wherein identifying the particular trained machine learning model includes: determining a particular cluster based on the user data associated with the user; and selecting the particular trained machine learning model as the model associated with the particular cluster.

In some implementations, the plurality of trained machine learning models includes a set of current models, each current model associated with a respective cluster and a set of candidate models, each candidate model associated with a respective cluster, and wherein identifying the particular trained machine learning model includes: assigning the request to one of a default group or a test group; if the request is assigned to the default group, selecting the particular trained machine learning model from the set of current models; and if the request is assigned to the test group, selecting the particular trained machine learning model from the set of candidate models.

In some implementations, the method further includes: receiving a user response to the list of items; and based on the user response, assigning a score to the particular trained machine learning model.

In some implementations, the user response includes information indicative of user engagement with at least one item in the list of items, wherein user engagement includes one or more of: the user viewing the at least one item or the user purchasing the at least one item.

In some implementations, the method further includes: aggregating respective scores for the set of current models and the set of candidate models; replacing the set of current models with the set of candidate models if the aggregated score of the set of candidate models is greater than the aggregated score of the set of current models; and initiating model training for a next generation set of models.

In some implementations, the method further includes: training a plurality of machine learning models to generate the plurality of trained machine learning models, wherein each machine learning model corresponds to a respective cluster of users and wherein the plurality of machine learning models have a same model structure, wherein the training includes, for each model: providing the input feature vector; obtaining the output feature vector; generating a rank for each item based on the output feature vector; and adjusting at least one model parameter of the model based on comparison of the generated rank with an known rank for each item.

In some implementations, the known rank is based on the behavioral parameters of a subset of users of the cluster.

In some implementations, the plurality of input feature values of the input feature vector comprise at least one of: item value; item price; item type; item revenue; and item appearance.

In some implementations, assigning the rank for each of the plurality of items comprises providing the output feature vector and plurality of items to a search algorithm configured to rank each item of the plurality of items for a particular cluster of users.

Implementations of this application may also additional methods. In some implementations, a method includes obtaining user data for a plurality of users of an online gaming platform, the user data including user profile data and behavioral parameters; applying a clustering algorithm to the user data to obtain a plurality of clusters, wherein each cluster includes one or more of the plurality of users, and wherein no user is in more than one cluster; and training a plurality of machine learning models, wherein each model corresponds to a respective cluster of the plurality of clusters and wherein the plurality of models have a same model structure, wherein the training includes, for each model: providing an input feature vector that includes a plurality of feature values for each item of a plurality of items; obtaining an output feature vector wherein the output feature vector includes a modified value for each of the plurality of values for each item; generating a rank for each item based on the output feature vectors; and adjusting at least one model parameter of the model based on comparison of the generated rank with an known rank for each item.

Various implementations and examples of the method are described. For example, in some implementations, training the plurality of machine learning models is performed in parallel.

In some implementations, the known rank is based on the behavioral parameters of a subset of users of the cluster.

In some implementations, training the plurality of machine learning models is repeated one or more times until the generated ranks and the known ranks are within a threshold distance.

In some implementations, each model includes a single node with Sigmoid function.

In some implementations, each model undergoes supervised training and analysis.

In some implementations, adjusting the at least one model parameter includes adjusting a weight of a node of the model.

In some implementations, the obtaining, applying, and training steps are performed periodically.

In some implementations, the plurality of input feature values of the input feature vector comprise at least one of: item value; item price; item type; item revenue; and item appearance.

Some implementations can include a system comprising a memory with instructions stored thereon and a processing device, coupled to the memory, the processing device configured to access the memory and execute the instructions. The instructions cause the processing device to perform operations including: obtaining user data for a plurality of users of an online gaming platform, the user data including user profile data and behavioral parameters; applying a clustering algorithm to the user data to obtain a plurality of clusters, wherein each cluster includes one or more of the plurality of users, and wherein no user is in more than one cluster; and training a plurality of machine learning models, wherein each model corresponds to a respective cluster of the plurality of clusters and wherein the plurality of models have a same model structure, wherein the training includes, for each model: providing an input feature vector that includes a plurality of feature values for each item of a plurality of items; obtaining an output feature vector wherein the output feature vector includes a modified value for each of the plurality of values for each item; generating a rank for each item based on the output feature vectors; and adjusting at least one model parameter of the model based on comparison of the generated rank with an known rank for each item.

Some implementations can include a non-transitory computer-readable medium with instructions stored thereon that, responsive to execution by a processing device, causes the processing device to perform operations. The operations can include: receiving, from a user, a request for a list of items available on an online gaming platform; identifying a particular trained machine learning model from a plurality of trained machine learning models based at least in part on user data associated with the user; providing an input feature vector to the particular trained machine learning model, wherein the input feature vector includes a plurality of feature values for each item of a plurality of items; obtaining an output feature vector from the particular trained machine learning model, wherein the output feature vector includes a modified feature value for each of the plurality of feature values for each item; assigning a rank for each of the plurality of items based on the output feature vector; generating the list of items, wherein items in the list of items are ordered based on respective ranks; and providing a user interface to the user that includes the list of items.

DETAILED DESCRIPTION

Figure 1:
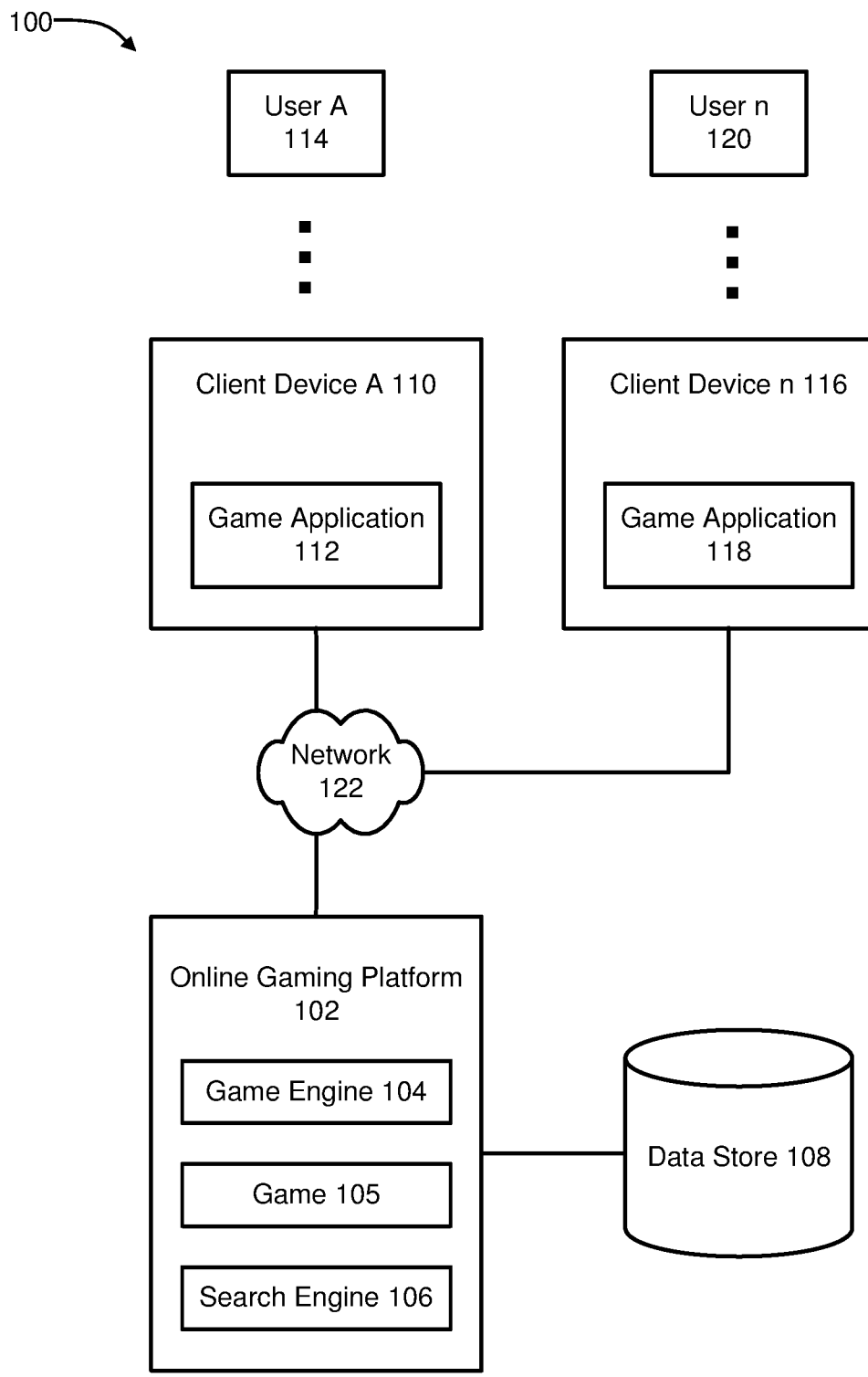
FIG. 1 is a diagram of an example system architecture, in accordance with some implementations.

One or more implementations described herein relate to generation and display of search results with dynamically customized rankings of items associated with an online gaming platform. Features can include dynamically ranking individual items in a list of items based on user profile data, behavioral parameters, and/or other factors.

Online gaming platforms (also referred to as "user-generated content platforms" or "user-generated content systems") offer a variety of ways for users to interact with one another. For example, users of an online gaming platform may create games or other content or resources (e.g., characters, graphics, items for game play within a virtual world, etc.) within the gaming platform.

Users of an online gaming platform may work together towards a common goal in a game or in game creation, share various virtual gaming items, send electronic messages to one another, and so forth. Users of an online gaming platform may play games, e.g., including characters (avatars) or other game objects and mechanisms. An online gaming platform may also allow users of the platform to communicate with each other. For example, users of the online gaming platform may communicate with each other using voice messages (e.g., via voice chat), text messaging, video messaging, or a combination of the above. Some online gaming platforms can provide a virtual three-dimensional environment in which users can play an online game.

In order to help enhance the entertainment value of an online gaming platform, the platform can provide a search engine for games, game content, or other game related resources, where users of the online gaming platform may search for game-related content or such other content using the search engine. Since games and game resources may be being created, changed, and added to available game data at high rates by various users (including game creators/developers and/or game players), the search engine provides improved discoverability of available games and resources.

For example, a user can input a search query to the search engine that indicates a request for items or resources sought by the user. The search engine searches a set of game data and provides as outputs search results which may include a list of items and/or game-related resources that were determined by the search engine to match the search query, ranked by a default vector considered by a search algorithm. The default vector may be representative of item features for items available on the platform, optionally with weights assigned to the feature determined based on preferences of the users of the platform. In some implementations, the default vector may be based on trends for a large subset of the users or a majority of the users of the platform. Accordingly, a search result may be ranked based on these trends such that items can be selected by a user to view/purchase an item, initiate and enter the associated game, to communicate with an associated user, or perform some other action related to the selected search result.

However, in some situations, search results provided by such search engines may not be satisfactory for a user. For example, the search engine may provide a large number of search results, potentially causing confusion and frustration to users who are looking for a targeted set of search results relating to their interests or activity. In some online gaming platforms, users have the ability to create a large variety of games, game types, resources etc., thus causing a large number of potential matches to search queries and large numbers of search results ranked based on the default vector data.

Furthermore, considering the ephemeral nature of personal interest in a game, rapid changes in gaming patterns, variety of items available, and other factors, targeted search results may be difficult to generate based on such variability. While the default vector may improve visibility of some items based on an overarching set of preferences, individual preferences may be partially or entirely ignored.

In addition, the online gaming platform may have a large number of users, e.g., millions of users, whose habits change regularly, periodically, or randomly. Thus, even if a default vector is useful in providing a game developer insight into popular game resources and items, such ranked search results may cause wasteful follow-up searches by a user in order to personalize results based on search query manipulation. These interactions may detract from enjoyable gameplay or otherwise reduce user engagement with the platform.

Features described herein provide search results that are relevant to a user through intelligent clustering of users and training of machine learning models specific to each generated cluster. For example, user profile data and user behavioral parameters may be used to group similar users into one or more clusters. Furthermore, each cluster may have an associated machine learning model.

Through training of the machine learning model based on user interaction and other data, a cluster-specific, modified vector may be generated such that search results may be ranked based on the modified vector, while preserving the default vector for other uses. Each cluster may have its own modified vector updated periodically, thereby improving ranking of search results for users in a particular cluster.

Additionally, users may be reassigned to new clusters (e.g., by reanalyzing the set of users of the platform and generating new clusters) periodically based on a variety of factors, including engaging in different games, gaming styles, lengths of gaming sessions, times of gaming sessions, locale/region of users, ages of users, gender, language, and other factors. Thus, a default vector may be preserved for use in general searches, administration, default rankings for items, and other uses, while periodically updated clusters of users and corresponding machine learning models may be used to generate cluster-specific vectors to rerank search results such that users in a particular cluster are provided ranked search results that are likely closer to the preferences of the users that belong in the particular cluster.

By providing more relevant and meaningfully ranked search results in response to search queries, disclosed features provide technical advantages including reduction of searches of game data as well as reduction in time spent interpreting search results not of interest to users, thus leading to reduction of use of computational resources (e.g., computer memory, processor, networking traffic, of a server etc.) used to generate and present search results to user devices. For example, when a user finds useful game items as a result of their initial search or within the first few searches (which is made more likely by the use of user clusters and cluster-specific vectors), extra search computations to retrieve items are eliminated, thus saving computational resources in generating search results, transmitting search results to user devices, and the computational resources of the user device to display the search results.

Further, the described features reuse existing ranking algorithms to rank game items based on cluster-specific feature vectors. Thus, storage resources that would be necessary to store multiple different ranked lists of items are saved. Still further, the described features allow different weights to allocated to different item features (or attributes), based on each user cluster, prior to the ranking of items. The separation of cluster generation and item ranking allows each process to be performed separately and asynchronously such that the search engine can continue to function when clusters and cluster-specific vectors are recomputed, and the search engine can update ranking algorithms or techniques independent of item features.

FIG. 1 illustrates an example system architecture 100, in accordance with some implementations of the disclosure. The system architecture 100 (also referred to as "system" herein) includes an online gaming platform 102, a first client device 110, a second client device 116 (generally referred to as "client devices 110/116" herein), and a network 122. The online gaming platform 102 can include, among other things, a game engine 104, one or more games 105, a search engine 106, and a data store 108. The client device 110 can include a game application 112. The client device 116 can include a game application 118. Users 114 and 120 can use client devices 110 and 116, respectively, to interact with the online gaming platform 102.

System architecture 100 is provided for illustration. In some implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online gaming platform 102 can include a server having one or more computing devices (e.g., a cloud computing system, a rackmount server, a server computer, cluster of physical servers, virtual server, etc.). In some implementations, a server may be included in the online gaming platform 102, be an independent system, or be part of another system or platform.

In some implementations, the online gaming platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming platform 102 and to provide a user with access to online gaming platform 102. The online gaming platform 102 may also include a website (e.g., one or more webpages) or application back-end software that may be used to provide a user with access to content provided by online gaming platform 102. For example, users may access online gaming platform 102 using the game application 112/118 on client devices 110/116, respectively.

In some implementations, online gaming platform 102 may include a type of social network providing connections between users or a type of user-generated content system that allows users (e.g., end-users or consumers) to communicate with other users via the online gaming platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming platform 102 may be a virtual gaming platform. For example, the gaming platform may provide single-player or multiplayer games to a community of users that may access or interact with games (e.g., user generated games or other games) using client devices 110/116 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may search for games and game items, and participate in gameplay with other users in one or more games. In some implementations, a game may be played in real-time with other users of the game.

In some implementations, other collaboration platforms can be used with search and presentation features described herein instead of or in addition to online gaming platform 102. For example, a social networking platform, purchasing platform, messaging platform, creation platform, etc. can be used.

In some implementations, gameplay may refer to interaction of one or more players using client devices (e.g., 110 and/or 116) within a game (e.g., 105) or the presentation of the interaction on a display or other output device of a client device 110 or 116.

One or more games 105 are provided by the online gaming platform. In some implementations, a game 105 can include an electronic file that can be executed or loaded using software, firmware or hardware configured to present the game content (e.g., digital media item) to an entity. In some implementations, a game application 112/118 may be executed and a game 105 rendered in connection with a game engine 104. In some implementations, a game 105 may have a common set of rules or common goal, and the environments of a game 105 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game 105 may be collectively referred to a "world" or "gaming world" or "virtual world" or "universe" herein. An example of a world may be a 3D world of a game 105. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming platform 102 can host one or more games 105 and can permit users to interact with the games 105 (e.g., search for games, game-related content, or other content) using a game application 112/118 of client devices 110/116. Users (e.g., 114 and/or 120) of the online gaming platform 102 may play, create, interact with, or build games 105, search for games 105, communicate with other users, create and build objects (e.g., also referred to as "item(s)" or "game objects" or "virtual game item(s)" herein) of games 105, and/or search for objects. For example, in generating user-generated virtual items, users may create characters, decoration for the characters, one or more virtual environments for an interactive game, or build structures used in a game 105, among others.

In some implementations, users may buy, sell, or trade game virtual game objects, such as in-platform currency (e.g., virtual currency), with other users of the online gaming platform 102. In some implementations, online gaming platform 102 may transmit game content to game applications (e.g., 112). In some implementations, game content (also referred to as "content" herein) may refer to any data or software instructions (e.g., game objects, game, user information, video, images, commands, media item, etc.) associated with online gaming platform 102 or game applications.

In some implementations, game objects (e.g., also referred to as "item(s)" or "objects" or "virtual game item(s)" herein) may refer to objects that are used, created, shared or otherwise depicted in game applications 105 of the online gaming platform 102 or game applications 112 or 118 of the client devices 110/116. For example, game objects may include a part, model, character, tools, weapons, clothing, buildings, vehicles, currency, flora, fauna, components of the aforementioned (e.g., windows of a building), and so forth.

It may be noted that the online gaming platform 102 hosting games 105, is provided for purposes of illustration, rather than limitation. In some implementations, online gaming platform 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 105 may be associated with a particular user or a particular group of users (e.g., a private game), or made widely available to users of the online gaming platform 102 (e.g., a public game). In some implementations, where online gaming platform 102 associates one or more games 105 with a specific user or group of users, online gaming platform 102 may associated the specific user(s) with a game 105 using user account information (e.g., a user account identifier such as username and password).

In some implementations, online gaming platform 102 or client devices 110/116 may include a game engine 104 or game application 112/118. The game engine 104 can include a game application similar to game application 112/118. In some implementations, game engine 104 may be used for the development or execution of games 105. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.). In some implementations, game applications 112/118 of client devices 110/116, respectively, may work independently, in collaboration with game engine 104 of online gaming platform 102, or a combination of both.

In some implementations, both the online gaming platform 102 and client devices 110/116 execute a game engine (104, 112, and 118, respectively). The online gaming platform 102 using game engine 104 may perform some or all the game engine functions (e.g., generate physics commands, rendering commands, etc.), or offload some or all the game engine functions to game engine 104 of client device 110. In some implementations, each game 105 may have a different ratio between the game engine functions that are performed on the online gaming platform 102 and the game engine functions that are performed on the client devices 110 and 116.

For example, the game engine 104 of the online gaming platform 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming platform 102 and client device 110 may be changed (e.g., dynamically) based on gameplay conditions. For example, if the number of users participating in gameplay of a game 105 exceeds a threshold number, the online gaming platform 102 may perform one or more game engine functions that were previously performed by the client devices 110 or 116.

For example, users may be playing a game 105 on client devices 110 and 116, and may send control instructions (e.g., user inputs, such as right, left, up, down, user election, or character position and velocity information, etc.) to the online gaming platform 102. Subsequent to receiving control instructions from the client devices 110 and 116, the online gaming platform 102 may send gameplay instructions (e.g., position and velocity information of the characters participating in the group gameplay or commands, such as rendering commands, collision commands, etc.) to the client devices 110 and 116 based on control instructions. For instance, the online gaming platform 102 may perform one or more logical operations (e.g., using game engine 104) on the control instructions to generate gameplay instruction for the client devices 110 and 116. In other instances, online gaming platform 102 may pass one or more or the control instructions from one client device 110 to other client devices (e.g., 116) participating in the game 105. The client devices 110 and 116 may use the gameplay instructions and render the gameplay for presentation on the displays of client devices 110 and 116.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming platform 102. In other implementations, the control instructions may be sent from a client device 110 to another client device (e.g., 116), where the other client device generates gameplay instructions using the local game engine 104. The control instructions may include instructions to play a voice communication message or other sounds from another user on an audio device (e.g., speakers, headphones, etc.).

In some implementations, gameplay instructions may refer to instructions that allow a client device 110 (or 116) to render gameplay of a game, such as a multiplayer game. The gameplay instructions may include one or more of user input (e.g., control instructions), character position and velocity information, or commands (e.g., physics commands, rendering commands, collision commands, etc.).

In some implementations, characters (or game objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the game 105. In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online gaming platform 102. In some implementations, creating, modifying, or customizing characters, other game objects, games 105, or game environments may be performed by a user using a user interface (e.g., developer interface) and with or without scripting (or with or without an application programming interface (API)). It may be noted that for purposes of illustration, rather than limitation, characters are described as having a humanoid form. In may further be noted that characters may have any form such as a vehicle, animal, inanimate object, or other creative form.

In some implementations, the online gaming platform 102 may store characters created by users in the data store 108. In some implementations, the online gaming platform 102 maintains a character catalog and game catalog that may be presented to users via the search engine 106, game engine 104, game 105, and/or client device 110/116. In some implementations, the game catalog includes images of games stored on the online gaming platform 102. In addition, a user may select a character (e.g., a character created by the user or other user) from the character catalog to participate in the chosen game. The character catalog includes images of characters stored on the online gaming platform 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming platform 102.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online gaming platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the game application 112 or 118, respectively. In one implementation, the game application 112 or 118 may permit users to use and interact with online gaming platform 102, such as search for a game or other content, control a virtual character in a virtual game hosted by online gaming platform 102, or view or upload content, such as games 105, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 or 116 and allows users to interact with online gaming platform 102. The game application may render, display, or present the content (e.g., a web page, a user interface, a media viewer) to a user. In an implementation, the game application may also include an embedded media player (e.g., a Flash® player) that is embedded in a web page.

According to aspects of the disclosure, the game application 112/118 may be an online gaming platform application for users to build, create, edit, upload content to the online gaming platform 102 as well as interact with online gaming platform 102 (e.g., play games 105 hosted by online gaming platform 102). As such, the game application 112/118 may be provided to the client device 110 or 116 by the online gaming platform 102. In another example, the game application 112/118 may be an application that is downloaded from a server.

In some implementations, a user may login to online gaming platform 102 via the game application. The user may access a user account by providing user account information (e.g., username and password) where the user account is associated with one or more characters available to participate in one or more games 105 of online gaming platform 102.

In general, functions described as being performed by the online gaming platform 102 can also be performed by the client device(s) 110 or 116, or a server, in other implementations if appropriate. In addition, the functionality attributed to a particular component can be performed by different or multiple components operating together. The online gaming platform 102 can also be accessed as a service provided to other systems or devices through appropriate application programming interfaces (APIs), and thus is not limited to use in websites.

In some implementations, online gaming platform 102 may include a search engine 106. In some implementations, the search engine 106 may be a system, application, or module that permits the online gaming platform 102 to provide search functionality to users, where the search functionality permits the users to search for games, game-related content, items, listing of items, or other content within the online gaming platform 102. In some implementations, the search engine 106 may perform one or more of the operations described below in connection with the flowcharts shown in FIGS. 4 and 5, utilizing the features illustrated in FIGS. 2 and 3.

Figure 2:
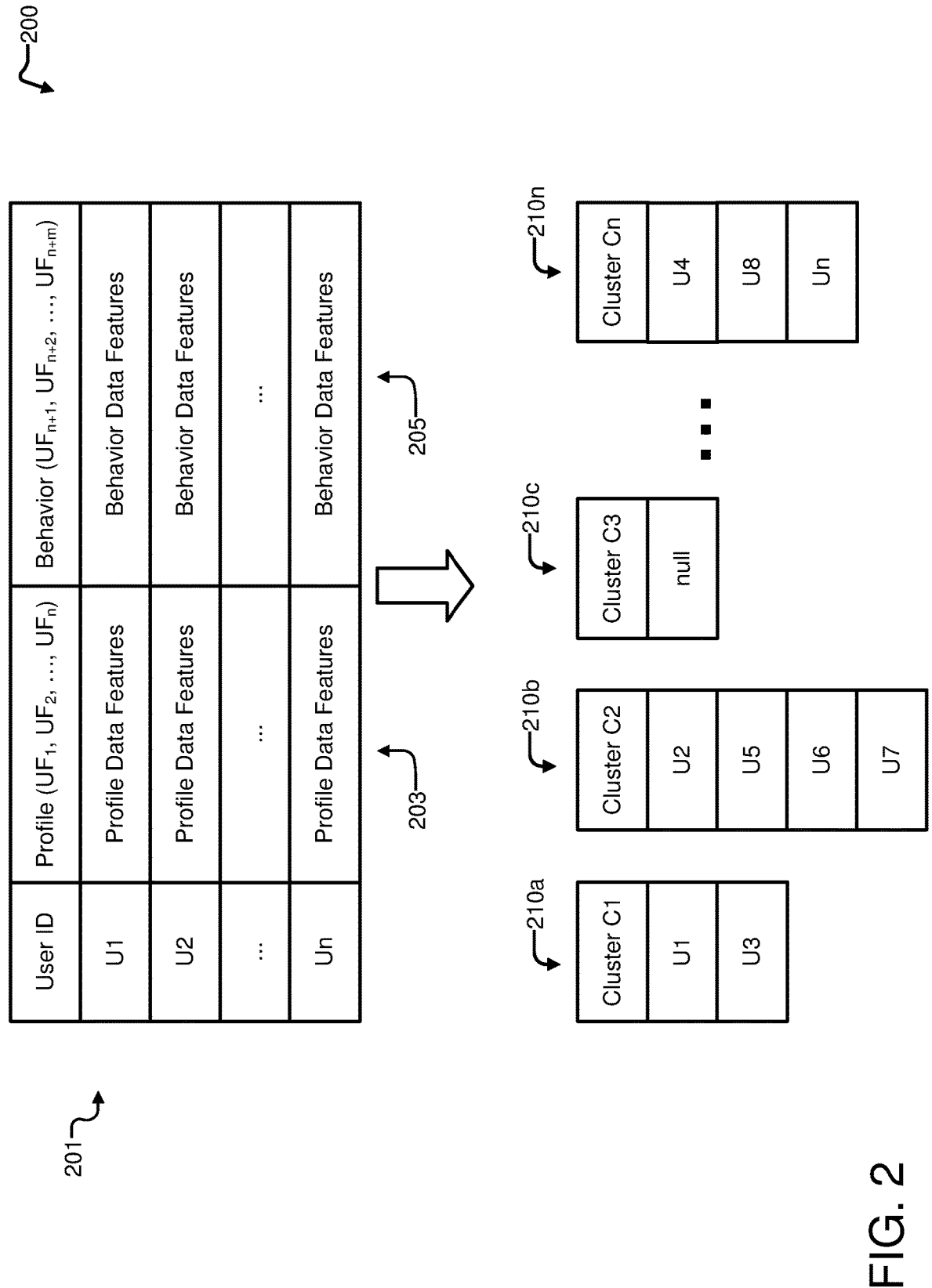
FIG. 2 is a schematic that illustrates clustering of users, in accordance with some implementations.

FIG. 2 is a schematic 200 that illustrates clustering of users, in accordance with some implementations. In some implementations, with permission from users, user data 201 may be stored by the online gaming platform 102, e.g., in data store 108. The user data 201 may include, but is not limited to, User IDs, profile data features 203, behavioral data features 205 (behavioral parameters), and/or other data features. It is noted that although illustrated in tabular form, any suitable data storage form may be used to organize the user data 201.

For each user, the stored data may be based on user-specific permissions provided by the user. Users are provided with options to choose the specific data that may be stored, and parameters associated with storage of such data (e.g., time period for which data may be stored), and how the data can be used (e.g., aggregated, processed, or otherwise analyzed). Further, storage of user data is performed in compliance with applicable regulations (e.g., in the user's geography). Certain data may be processed such that personally-identifiable information (PII) of the users is not stored or cannot be retrieved from the stored data. Access to the data for various programs of the platform is restricted such that only specific programs that perform particular user-permitted can access user data the data. For example, data may be aggregated (e.g., over multiple user accounts) or otherwise processed prior to provision of data to certain programs.

Profile data features 203 may include relatively static features about a user. For example, in some implementations, the profile data features 203 can include age, gender, language, region/locale, client device type, time of access, whether the user is a platform subscriber, and/or other suitable profile data features. Other suitable profile data features may also be applicable, and may include other data features such as nicknames, secondary language, most used characters/avatars, awards/achievements, and other data features.

Behavioral data features 205 (also referred to as behavioral parameters) may include dynamic features as well as static features. For example, in some implementations, the behavioral data features 205 can include purchase history (e.g., bought at least one item last week), types of items purchased, types of items viewed, gameplay history (e.g., played "pizza place" daily for a month), types of games played, engagement measures (e.g., engagement level, engagement time, etc.), new user designations (e.g., no prior behavioral data), prior search data (e.g., searched for a particular types of items, such as clothing items for avatars, weaponry, decorative items, etc.), and other suitable behavioral data features. Other suitable behavioral data features may also be applicable.

The user data 201 may be utilized to generate a plurality of user clusters 210a, 210b, 210c, 210n (generally referred to as "Cluster 210" or "Clusters 210") based on grouping similar users. For example, clustering algorithms may be used to group users U1 and U3 into Cluster C1, users U2, U5, U6, and U7 into Cluster C2, and users U4, U8, and Un into Cluster Cn. The particular number and organization of the clusters 210 are illustrative and not limiting. More or fewer users and clusters are possible given any particular implementation and number of users, type of user data 201, and clustering techniques used.

In some implementations, each cluster 210 may have any number of users (e.g., 1, 5, 10, 1000, 10000, etc.), and each cluster 210 may be based on various combinations of user features, with specific values of features being subdividing features. For example, and without limitation, Cluster C1 may be based on features: {Age: 10-12, Region: CA, USA, Language: Spanish, Behavior: bought hats in the past week}. Similarly, Cluster C2 may be based on features: {Age: 13, Region: CA, USA, Language: Spanish, Behavior: viewed hats in the past week but did not buy}. It should be readily understood that any combinations of features may be used to cluster and organize the user data 201 as appropriate for any desired implementation.

In some implementations, clustering techniques may include machine learning techniques (e.g., unsupervised machine learning) that automatically partitions the set of users into a plurality of clusters. In some implementations, supervised machine learning techniques may be used, e.g., that include feedback, to generate user clusters that usefully group different types of users in a way that each group of users is likely to have similar search and/or item purchase behavior on the platform. Furthermore, in some implementations, each cluster 210 is non-overlapping, that is, no user is assigned to more than one cluster. However, users can be reassigned to different clusters periodically as described herein.

In some implementations, clusters are determined anew at each iteration. In some implementations, determination of clusters is based on recent user actions. In these implementations, information regarding prior clusters, e.g., which users were in the same clusters in a prior computation of clusters is not used in the generation of clusters in a current iteration.

In some implementations, and as described with reference to FIG. 4, each cluster 210 may have a cluster-specific machine learning model associated therewith. The associated machine learning model may be trained (either supervised or unsupervised) to create modified feature vectors for items that facilitate customized rankings of items for search results and/or listings through the search engine 106. In some implementations, the machine learning model is a single node machine learning model with a Sigmoid function. Other machine learning models may also be applicable, including more complex machine learning models with multiple nodes. The output modified feature vector provided by each trained machine learning model can be used to provide customized ranked lists for presentation to users through an appropriate interface, such as a graphical user interface, as illustrated in FIG. 3.

Figure 3:
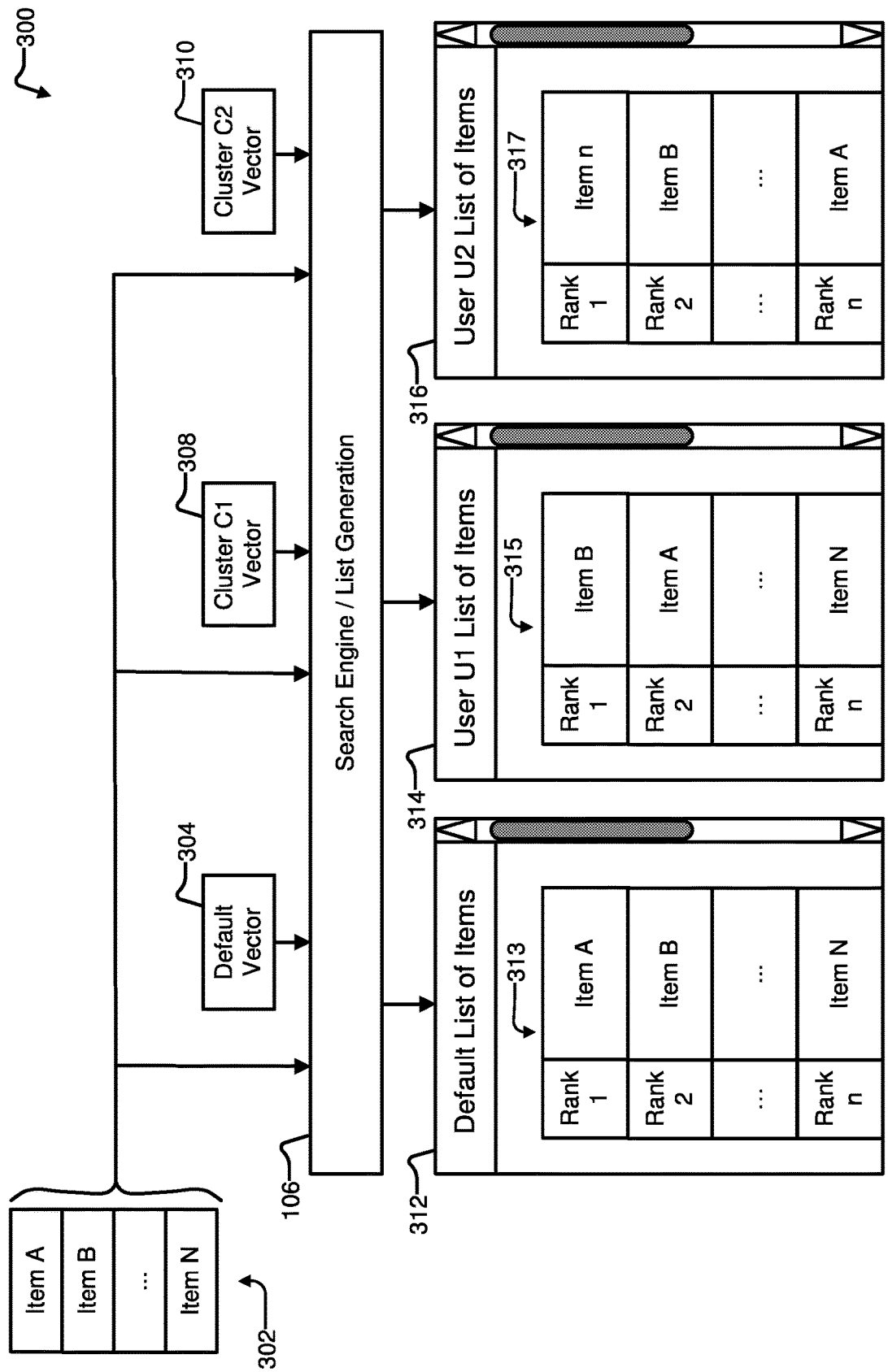
FIG. 3 is a schematic of example user interfaces with lists of items with customized rankings, in accordance with some implementations.

FIG. 3 is a schematic 300 of example user interfaces with lists of items with customized rankings, in accordance with some implementations. As illustrated, a number of game resources or items 302 may be stored at the online gaming platform 102, for example, through the data store 108. Furthermore, a default vector 304 may be established, e.g., based on averaging (or otherwise combining) user preferences from a user base of the online gaming platform 102. The default vector 304 may also be based on item revenue, total sales, total engagement, overall popularity, overall number of views, and/or other factors.

The default vector 304 and items 302 may be input to search engine 106 such that a default list of items 313 may be presented through user interface 312. For example, such a list may be appropriate to certain types of users, e.g., new users (for whom no user data is available), basic users (e.g., users for whom the available behavior data is insufficient for usefully clustering or users who have opted out of use of their data for search customization), administrators, game creators or developers, and/or other classes or types of users. The default list of items 313 may include default rankings for each item of the items 302 such that they are presented in a ranked or sorted order. In one implementation, the search engine 106 that provides the default list of items 313 is based on Elasticsearch. In other implementations, any suitable search engine (e.g., Apache Solr™, etc.) implementing any suitable search algorithm may be used.

As further illustrated, a modified vector 308 for cluster C1 and a modified vector 310 for cluster C2 may also be provided. The modified vectors 308 and 310 may be generated through a trained machine learning model associated with clusters C1 and C2, respectively. Although only illustrated as two modified vectors, it should be readily understood that several modified vectors, each associated with a particular cluster 210 are applicable to any implementation depending upon a particular number of clusters used.

Furthermore, each cluster has associated therewith a particular trained machine learning model. Modified vectors 308 and 310 may respectively be representative of user behavior for certain types of items, based on the respective cluster-specific user data, such that using the vector as input to the search engine causes the search engine to weight different item features differently for different clusters of users and in turn, to generate cluster-specific search rankings. While the description herein uses the term vector, it may be understood that the term is representative of any mathematical representation, e.g., multidimensional feature vector (where each item feature is a dimension), matrix, or an embedding, that is generated by the cluster-specific machine learning model.

The search engine 106 may further provide a customized ranked list 315 and 317 based on the modified vectors 308 and 310, respectively. Each customized ranked list 315 and 317 may be presented to a user in each of clusters C1 and C2 through an appropriate user interface 314 and 316, respectively. In this manner, a user assigned to cluster C1 may have a customized ranked list 315 presented in response to a search query that is customized based on the user data 201 and associated profile data and behavioral data. Similarly, a user assigned to cluster C2 may have a customized ranked list 317 presenting in response to a search query that is customized based on the user data 201 and associated profile data and behavioral data.

As described above, customized and dynamic rankings of items may be used to more accurately present search results to a user based on an assigned cluster. Hereinafter, details related to clustering of users and training of the associated machine learning models is described with reference to FIG. 4.

Figure 4:
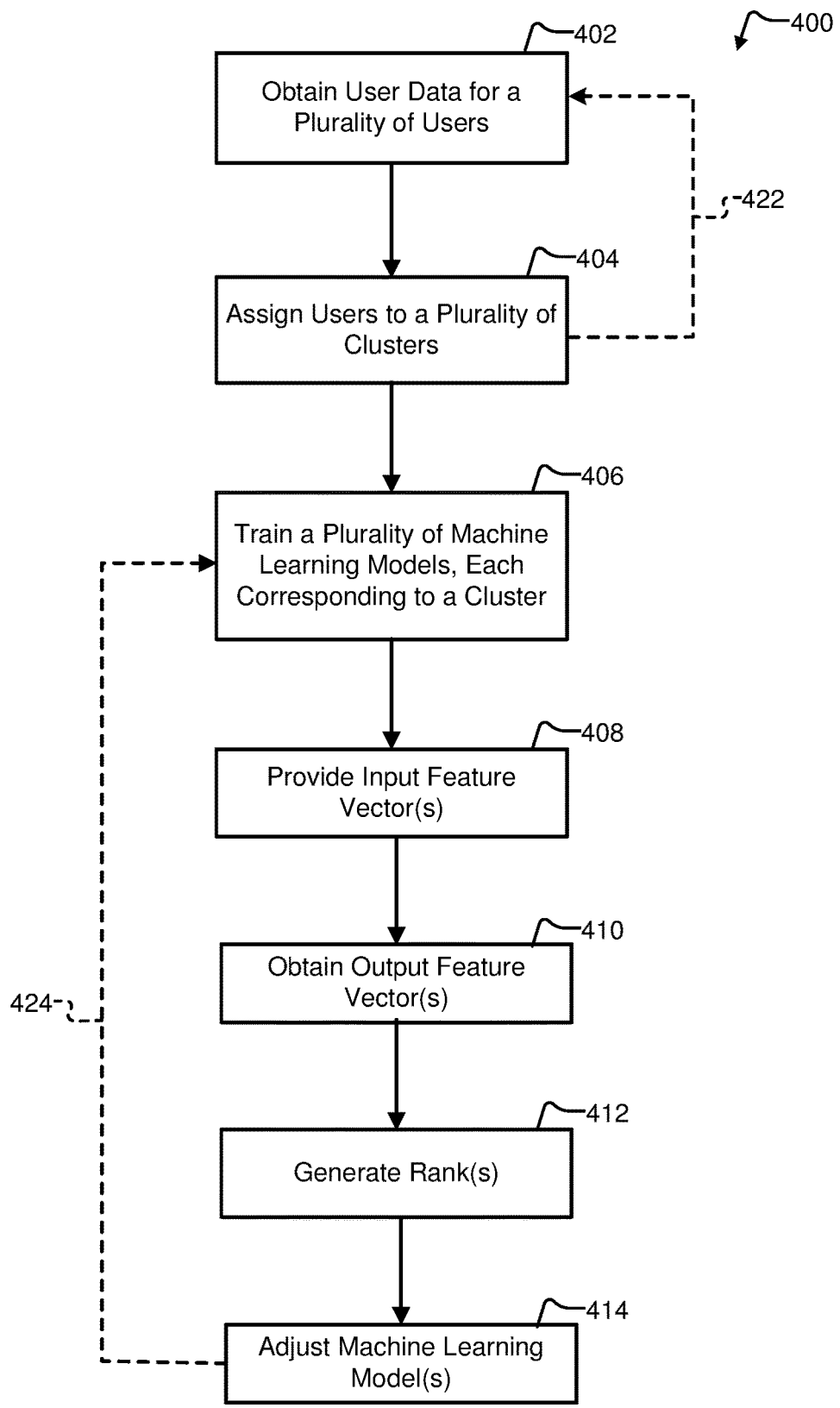
FIG. 4 is a flowchart of an example method to generate user clusters and train cluster-specific machine learning models, in accordance with some implementations.

FIG. 4 is a flowchart of an example method 400 to generate user clusters and train cluster-specific machine learning models, in accordance with some implementations. In some implementations, method 400 can be implemented, for example, on a server system, e.g., online gaming platform 102 as shown in FIG. 1. In some implementations, some or all of the method 400 can be implemented on a system such as one or more client devices 110 and 116 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 400. Method 400 may begin at block 402.

Blocks 402-404 illustrate clustering users into a plurality of clusters. In block 402, user data for a plurality of users is obtained, e.g., at a server. The user data can include user profile data (e.g., 203) and user behavioral parameters (e.g., 205). The user profile data may include age, gender, language, region/locale, client device type, time of access, and other suitable profile data. The behavioral parameters may include purchase history, types of items purchased, viewing history, types of items viewed, gameplay history, types of games played, engagement measures, new user designations, prior search data, and other suitable behavioral data. Block 402 may be followed by block 404.

In block 404, the plurality of users may be each assigned to a plurality of clusters. For example, in some implementations, a clustering algorithm may be applied to the user data to obtain a plurality of clusters. Each cluster of the plurality of clusters can include one or more of the plurality of users. Furthermore, no user should be in more than one cluster (e.g., non-overlap of users across clusters). The clusters may be arranged similarly to those illustrated in FIG. 2, or may differ. The clusters may each include a machine learning model associated therewith.

In some implementations, the clustering may be "refreshed" periodically as shown by operation 422. The time period for refresh may be a predetermined or desired time period such as every daily, weekly, monthly, or otherwise. The time period for refresh may also be a variable chosen by a platform developer or game developer. Still further, the time period for refresh may also be a variable chosen through any suitable metric, such as decrease in user engagement, increase in user engagement, decrease in revenue, increase in revenue, and other suitable metrics. Block 404 may be followed by block 406.

Blocks 406-414 illustrate training of cluster-specific machine learning models. At block 406, the method may include training a plurality of machine learning models. Each model corresponds to a single cluster. Furthermore, in some implementations, all models of the plurality of models have a same model structure. For example, the model structure may be a single node structure with a Sigmoid function, in some implementations. In some implementations, a more complex structure with more nodes and/or different algorithms may be used.

Each machine learning model may include coefficients for nodes (e.g., neural network nodes). The coefficient with the nodes of each model may be different, based on the group of users associated with the cluster. Each machine learning model may be initialized and trained.

Generally, the training may be performed supervised or unsupervised learning Furthermore, according to some implementations, if implemented using a single node and Sigmoid function, an administrator or game developer may hand-inspect the machine learning model (e.g., node coefficients) and model input (item feature values) and output vector along with model performance (whether the ranks generated by the ranking algorithm that takes the vector as input meet accuracy criteria).

In a complex environment where a large number of user clusters and corresponding models are utilized, the ability to hand inspect individual models may enable administrators of the game platform to selectively identify cluster-specific models that do not meet performance criteria and to re-run the clustering (e.g., blocks 402-404) and/or training of the cluster-specific model (e.g., blocks 406-414) such that the ranks generated meet accuracy thresholds.

At block 408, an input feature vector (e.g., 304) that includes a plurality of feature values for each item of a plurality of items (e.g., 302) may be provided to a machine learning model.

For example, each machine learning model is provided a list of the items available on the platform (e.g., items that can be utilized to customer a user's avatar on the platform, game-specific items, platform-wide items, etc.) and parameter values for each item in the item index. According to some implementations, the parameter values may be organized as a default vector such as:

item i1: {p1, p2, p3, . . . , pn}

Item features for each item from the vector (e.g., p1, p2, p3, etc.) can include whether the item is priced, its value, its type, revenue from the item, item color, item hit rate, item characteristics, engagement metrics for the item (e.g., aggregated across multiple users), item genre, and/or other parameters. In some implementations, the hit rate of the item may be determined for one or more query terms. For example, if an item X was clicked or purchased 10 times when displayed in response to a query term "car", the hit rate value of "10" associated with the query term "car" is used as a parameter. Further, different types of items may have a corresponding set of features. For example, avatar items may have avatar-related features, while other items may have specific features that are not used for avatar items and may not have features that are specific for avatar items. Block 408 may be followed by block 410.

At block 410, an output feature vector (e.g., 308, 310) that includes a modified value for each of the plurality of values for each item is obtained from the machine learning model. In some implementations, the output feature vector may include model coefficients for the machine learning model.

For example, each machine learning model generates as output a set of modified parameter values. According to some implementations, the parameter values may be organized as output feature vector such as:

item i1: {q1, q2, q3, . . . , qn}

Generally, the modified values of the output feature vector are based on the node (e.g., a single node of a particular cluster) modifying the input values (e.g., the machine learning model adjusts the weights of the features after the training a set of coefficients of the node that modifies the input vector). According to some implementation, the output of the machine learning model is always the class it is training for.

In other words, the output feature vector includes weights of different features of the machine learning model after training. Each particular user's input feature vector (also referred to as node) is used to train the machine learning model to learn weights of the feature, where the model is trained to predict the class for an input set of features. In some implementations, when stochastic gradient descent is used, the function used to train the model can be mean squared error, and the objective in each training iteration may be to reduce the error between the actual class (groundtruth) and the predicted class (predicted by the model under training). Block 410 may be followed by block 412.

At block 412, a rank is generated for each item based on the output feature vector. The rank may be generated by the search engine 106, in some implementations. The search engine may implement a ranking algorithm that takes as input the list of items and the output feature vector, and produces a sorted list of items, customized for the specific cluster. Block 412 may be followed by block 414.

At block 414, at least one model parameter for the machine learning model is adjusted based on a comparison of the generated rank with a known rank for each item. In some implementations, the known rank is based on the behavioral parameters of a subset of users of the cluster associated with the machine learning model being trained.

For example, generated rankings can be compared with actual observed behavior of a subset of users in the cluster (e.g., item i1 was ranked #1 and also had highest percentage of purchases for users in this cluster, whereas item i2 was ranked #2 but has a very low rate of purchases, etc.). These comparisons may be used as feedback to train the machine learning model, e.g., by adjusting weights on the node(s) of the machine learning model.

In some implementations, the training may be repeated periodically as shown by operation 424. The time period for a next round of training may be a predetermined or desired time period such as every daily, weekly, monthly, or otherwise. The training may also be repeated until the generated ranks and the known ranks are within a threshold distance.

Furthermore, in some implementations, various portions of method 400 may be repeated periodically. For example, blocks 402-404 may be performed to generate user clusters, e.g., once a week, once a month, on demand, when a certain number of new users join the platform, when the platform changes in other ways such as new games, new game items, new avatar accessories, etc. become available on the platform, etc. Furthermore, the training (blocks 406-414) may be performed separately from the clustering, in some implementations. For example, models for one or more clusters may be trained without changing the clusters, e.g., when model performance falls below a threshold, or changes to the platform. In this manner, updated user preferences based on user profile data and behavioral parameters may be taken into consideration by performing clustering and/or model training.

Blocks 402-414 can be performed (or repeated) in a different order than described above and/or one or more blocks can be omitted. For example, cluster generation (blocks 402-404) may be performed independently of model training (blocks 406-414). Further, training of multiple models (e.g., one model per cluster) may be performed in parallel, e.g., by performing blocks 406-414 in parallel for each cluster.

Figure 5:
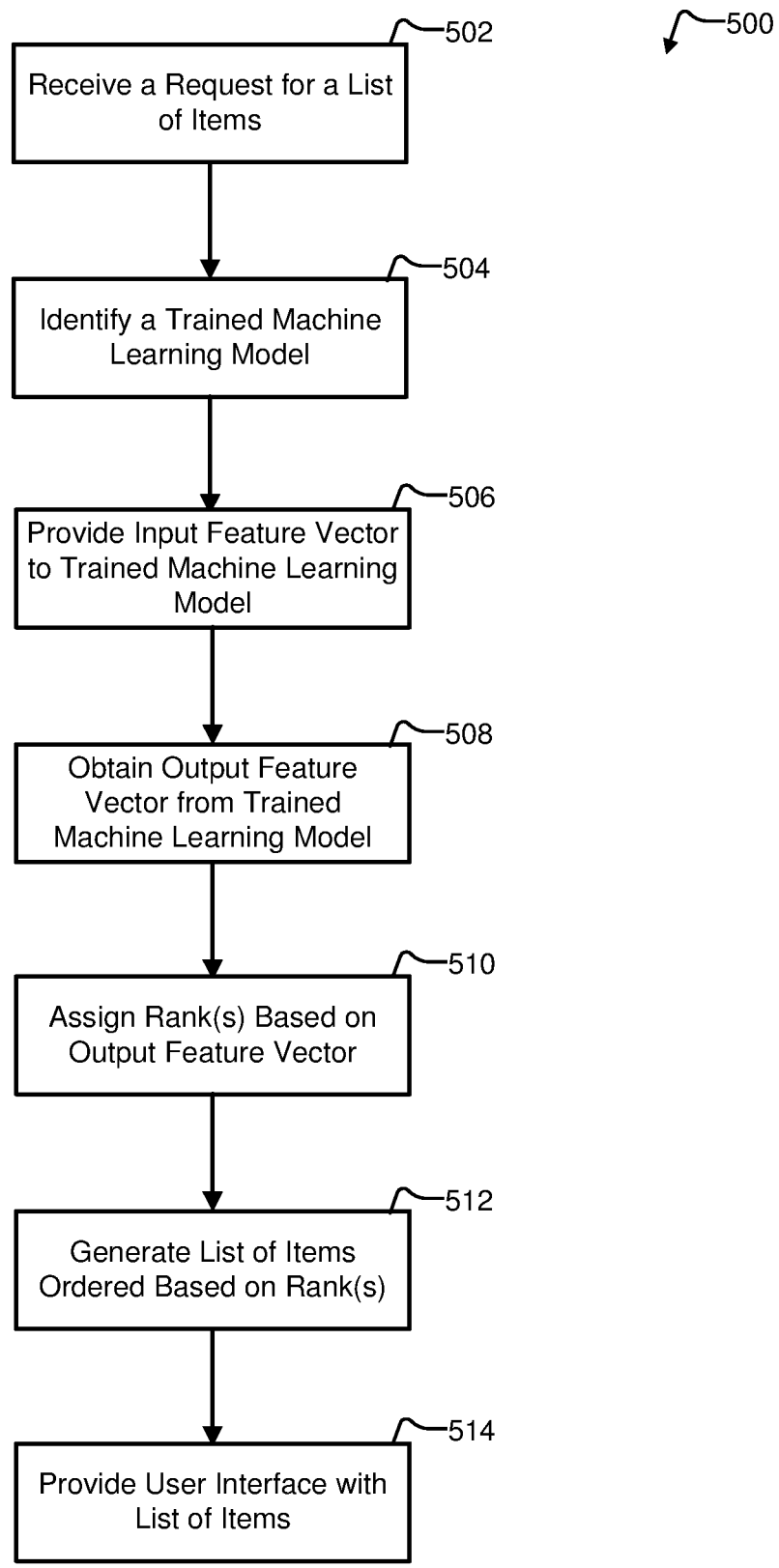
FIG. 5 is a flowchart of an example method 500 to provide dynamically customized ranked lists of items, in accordance with some implementations.

After training an initial set of machine learning models, or upon implementing a set of pre-trained or default initialized machine learning models (e.g., prior to training), the models may be used to generate customized rankings of items in search results, as described more fully with reference to FIG. 5.

FIG. 5 is a flowchart of an example method 500 to provide dynamically customized ranked lists of items, in accordance with some implementations. In some implementations, method 500 can be implemented, for example, on a server system, e.g., online gaming platform 102 as shown in FIG. 1. In some implementations, some or all of the method 500 can be implemented on a system such as one or more client devices 110 and 116 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 500. Method 500 may begin at block 502.

In block 502, a request for a list of items available on an online gaming platform (e.g., 102) may be received from a user (e.g., 114/120). For example, the user may utilize a search engine or other interface (e.g., browsing interface) provided by the platform. The list of available items may be stored in the online gaming platform 102, for example, through data store 108, in some implementations. Block 502 may be followed by block 504.

In block 504, a particular trained machine learning model is identified from a plurality of trained machine learning models based at least in part on user data 201 associated with the user issuing the request. For example, the user data 201 may be used to identify a cluster for the user. The identified cluster may be associated with a corresponding machine learning model. Block 504 may be followed by block 506.

In block 506, an input feature vector (e.g., 304) is provided to the particular trained machine learning model. The input feature vector may include a plurality of feature values as described in detail above, for each item of a plurality of items 302. Block 506 may be followed by block 508.

In block 508, an output feature vector (e.g., 308, 310) is obtained from the particular trained machine learning model. The output feature vector may include a modified value for each of the plurality of values for each item of the plurality of items 302. Block 508 may be followed by block 510.

In block 510, a rank is assigned for each item of the plurality of items based on the output feature vector. For example, the ranks may be generated using a ranking algorithm that takes the items and the output feature vector as input. The ranking algorithm may be implemented as part of search engine 106 implemented by the platform. Block 510 may be followed by block 512.

In block 512, a list of items (e.g., 315, 317) is generated based on the assigned ranks. The list of items is therefore tailored specifically based on the trained machine learning model associated with the cluster to which the user is assigned. Block 512 may be followed by block 514.

In block 514, a user interface (e.g., 314, 316) is provided to the user that includes the list of items (e.g., 315, 317). The user interface is therefore presented with customized dynamic rankings that may overcome drawbacks associated with the default rankings based on all or a majority of users.

Furthermore, according to some implementations, blocks 504-514 may include testing of candidate machine learning models to further improve user engagement and other metrics. For example, the plurality of trained machine learning models may include a set of current machine learning models and a set of candidate machine learning models. Each current machine learning model may be associated with a respective cluster. Furthermore, each candidate machine learning model may be associated with a respective cluster, as well.

During testing of candidate models, in block 504, the received request may be assigned to one of a default group or a test group. If the request is assigned to a default group, the particular trained machine learning model is selected from the set of current machine learning models. If the request is assigned to the test group, the particular trained machine learning model is selected from the set of candidate machine learning models.

After selection, a user response to the presented list of items may be received, e.g., selection of a particular item for viewing, purchase of particular item, etc. Based on the user response, a score is assigned to the particular trained machine learning model selected. The score includes information indicative of user engagement with at least one item in the list of items. In this implementation, user engagement includes one or more of the user viewing the at least one item or the user purchasing the at least one item. Other measures of user engagement may also be applicable.

Upon receipt of the user response, the respective score may be aggregated for the set of current machine learning models and the set of candidate machine learning models. Thereafter, the set of current machine learning models may be replaced with the set of candidate machine learning models if the aggregated score of the set of candidate machine learning models is greater than the aggregated score of the set of current machine learning models. Otherwise, the set of current machine learning models may be retained.

Additionally, after replacement of the set of current machine learning models or retaining the set of current machine learning models, machine learning model training of a new or next generation of machine learning models may be initiated, and further testing as noted above may be repeated to periodically refresh the set of machine learning models used.

Blocks 502-514 can be performed (or repeated) in a different order than described above and/or one or more blocks can be omitted. Methods 400 and/or 500 can be performed on a server (e.g., 102) and/or a client device (e.g., 110 or 116). Furthermore, portions of the methods 400 and 500 may be combined and performed in sequence or in parallel, according to any desired implementation.

As described above, the techniques of dynamic customized rankings can be implemented through clustering of users based on user data such that applicable and/or meaningful search results are presented ranked in a manner that increases or improves user engagement in an online gaming platform. The techniques may be customized to improve user engagement in other fields, including any field where a search engine is used to provide a ranked list of results.

The customized ranked list of search results may offer a personalized view for different users to explore items of interest, thereby improving a user experience. Through separate calculation of item ranks per cluster of users, different types and groups of users may receive search results more suitable or less frustrating than in conventional systems.

Furthermore, through separate calculation of item ranks per cluster based on machine learning models associated with each cluster, index parameters for a default input vector may be retained for other uses. Similarly, periodic retraining of machine learning models, and periodic refreshing of user clusters, may overcome drawbacks associated with on-the-fly search algorithms that are computationally intensive and use increased storage resources. Moreover, through testing of current and candidate sets of machine learning models as described above, results can be further improved over time.

Hereinafter, a more detailed description of various computing devices that may be used to implement different devices illustrated in FIG. 1 is provided with reference to FIG. 6.

Figure 6:
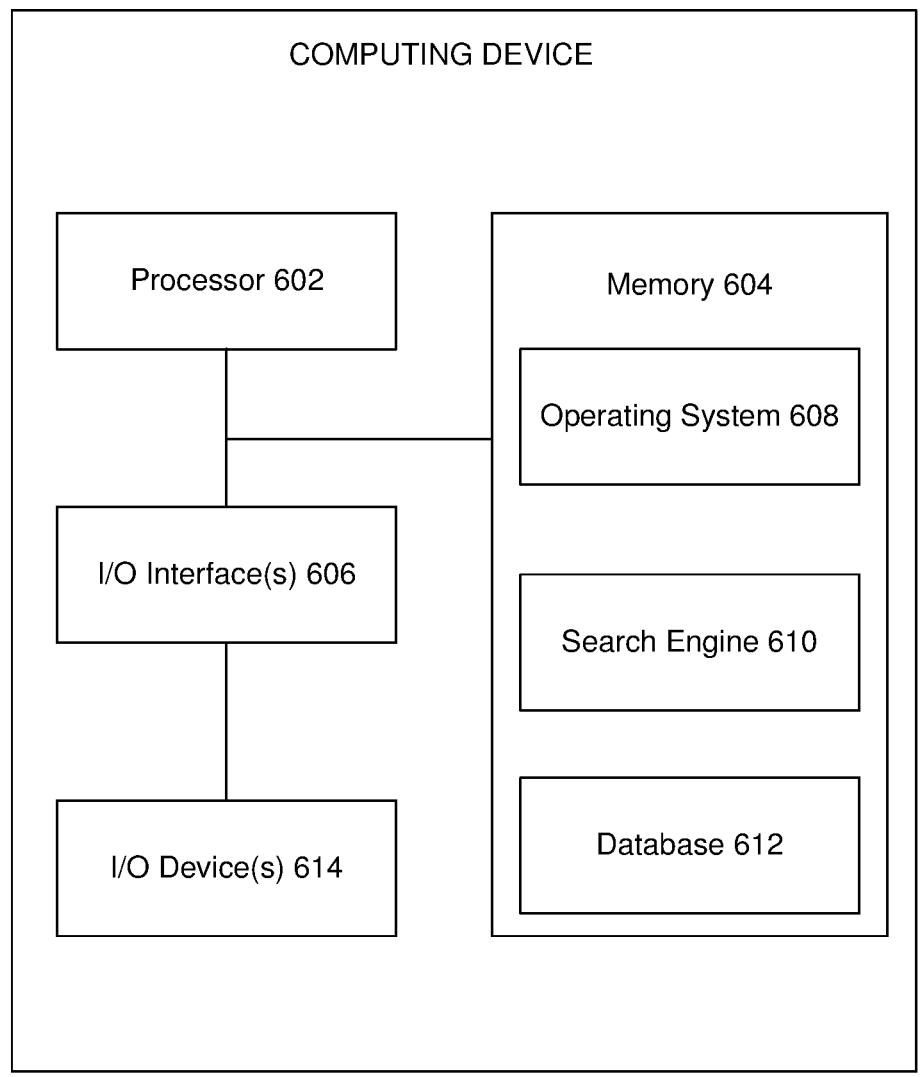
FIG. 6 is a block diagram illustrating an example computing device which may be used to implement one or more features described herein, in accordance with some implementations.

FIG. 6 is a block diagram of an example computing device 600 which may be used to implement one or more features described herein, in accordance with some implementations. In one example, device 600 may be used to implement a computer device, (e.g., 102, 110, and/or 116 of FIG. 1), and perform appropriate method implementations described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 600 includes a processor 602, a memory 604, input/output (I/O) interface 606, and audio/video input/output devices 614 (e.g., display screen, touchscreen, display goggles or glasses, audio speakers, microphone, etc.).

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, a search engine application 610 and associated data stored in a database 612. In some implementations, the search engine application 610 can include instructions that enable processor 602 to perform the functions described herein, e.g., some or all of the methods of FIGS. 4 and 5.

For example, memory 604 can include software instructions for a search engine 610 that can provide search with dynamically customized rankings within an online gaming platform (e.g., 102). Any of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 108), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 6 shows one block for each of processor 602, memory 604, I/O interface 606, software blocks 608 and 610, and database 612. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While the online gaming platform 102 is described as performing operations as described in some implementations herein, any suitable component or combination of components of online gaming platform 102 or similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., methods 400 and/or 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

In situations in which certain implementations discussed herein may obtain or use user data (e.g., user demographics, user behavioral data on the platform, user search history, items purchased and/or viewed, user's friendships on the platform, etc.) users are provided with options to control whether and how such information is collected, stored, or used. That is, the implementations discussed herein collect, store and/or use user information upon receiving explicit user authorization and in compliance with applicable regulations.

Users are provided with control over whether programs or features collect user information about that particular user or other users relevant to the program or feature. Each user for which information is to be collected is presented with options (e.g., via a user interface) to allow the user to exert control over the information collection relevant to that user, to provide permission or authorization as to whether the information is collected and as to which portions of the information are to be collected. In addition, certain data may be modified in one or more ways before storage or use, such that personally identifiable information is removed. As one example, a user's identity may be modified (e.g., by substitution using a pseudonym, numeric value, etc.) so that no personally identifiable information can be determined. In another example, a user's geographic location may be generalized to a larger region (e.g., city, zip code, state, country, etc.).

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   receiving, from a user, a request for a list of items available on an online gaming platform;
   identifying a particular cluster-specific trained machine learning model from a plurality of trained machine learning models based at least in part on user data associated with the user, wherein the user data includes user profile data and behavioral parameters, wherein each model of the plurality of trained machine learning models corresponds with a respective cluster as its cluster-specific machine learning model, wherein each cluster includes groups of users sharing a subset of one or more of the user profile data and the behavioral parameters, wherein no user is in more than one cluster, and wherein no cluster-specific trained machine learning model corresponds to more than one cluster;
   providing an input feature vector to the particular cluster-specific trained machine learning model, wherein the input feature vector includes a plurality of default feature values for each item of a plurality of items, wherein the default feature values include user preferences for items of the plurality of items, and wherein the default feature values are common among users of the online gaming platform;
   obtaining an output feature vector from the particular cluster-specific trained machine learning model, wherein the output feature vector includes a modified feature value that modifies each of the plurality of default feature values for each item in the output feature vector;
   assigning a rank for each of the plurality of items based on the output feature vector;
   generating the list of items, wherein items in the list of items are ordered based on respective ranks; and
   providing a user interface to the user that includes the list of items.

2. The computer-implemented method of claim 1, wherein identifying the particular cluster-specific trained machine learning model includes:
   determining a particular cluster based on the user data associated with the user; and
   selecting the particular cluster-specific trained machine learning model as the model that corresponds with the particular cluster.

3. The computer-implemented method of claim 1, wherein the plurality of trained machine learning models includes a set of current models, each current model of the set of current models associated with a respective cluster and a set of candidate models, each candidate model of the set of candidate models associated with a corresponding cluster, and wherein identifying the particular cluster-specific trained machine learning model includes:
   assigning the request to one of a default group or a test group;
   if the request is assigned to the default group, selecting the particular cluster-specific trained machine learning model from the set of current models; and
   if the request is assigned to the test group, selecting the particular cluster-specific trained machine learning model from the set of candidate models.

4. The computer-implemented method of claim 3, further comprising:
   receiving a user response to the list of items; and
   based on the user response, assigning a score to the particular cluster-specific trained machine learning model.

5. The computer-implemented method of claim 4, wherein the user response includes information indicative of user engagement with at least one item in the list of items, wherein user engagement includes one or more of: the user viewing the at least one item or the user purchasing the at least one item.

6. The computer-implemented method of claim 4, further comprising:
aggregating respective scores for the set of current models and the set of candidate models;
replacing the set of current models with the set of candidate models if the aggregated score of the set of candidate models is greater than the aggregated score of the set of current models; and
initiating model training for a next generation set of models.

7. The computer-implemented method of claim 1, further comprising:
training the plurality of machine learning models, wherein the plurality of machine learning models have a same model structure, and wherein the training includes, for each model:
obtaining a known rank for each item of the plurality of items; and
adjusting at least one model parameter of the model based on comparison of the rank with the known rank for each of the plurality of items.

8. The computer-implemented method of claim 7, wherein the known rank is based on behavioral parameters of a subset of users of the cluster for the model.

9. The computer-implemented method of claim 1, wherein the plurality of feature values of the input feature vector comprise at least one of:
item value;
item price;
item type;
item revenue; or item appearance.

10. The computer-implemented method of claim 1, wherein assigning the rank for each of the plurality of items comprises providing the output feature vector and plurality of items to a search engine configured to rank each item of the plurality of items for a particular cluster of users.

11. A computer-implemented method comprising:
obtaining user data for a plurality of users of an online gaming platform, the user data including user profile data and behavioral parameters;
applying a clustering algorithm to the user data to obtain a plurality of clusters, wherein each cluster includes one or more of the plurality of users, wherein each cluster includes groups of users sharing a subset of one or more of the user profile data and the behavioral parameters, and wherein no user is in more than one cluster; and
training a plurality of machine learning models, wherein each model corresponds to a respective cluster of the plurality of clusters as its cluster-specific machine learning model, wherein the plurality of machine learning models have a same model structure, wherein no cluster-specific machine learning model corresponds to more than one cluster, and wherein the training includes, for each model:
providing an input feature vector that includes a plurality of default feature values for each item of a plurality of items, wherein the default feature values include user preferences for items of the plurality of items, and wherein the default feature values are identical among users of the online gaming platform;
obtaining an output feature vector wherein the output feature vector includes a modified value that modifies each of the plurality of default feature values for each item in the output feature vector;
generating a rank for each item based on the output feature vector; and
adjusting at least one model parameter of the model based on comparison of the generated rank with a known rank for each item.

12. The computer-implemented method of claim 11, wherein the training of the plurality of machine learning models is performed in parallel.

13. The computer-implemented method of claim 11, wherein the known rank is based on the behavioral parameters of a subset of users of the cluster for the model.

14. The computer-implemented method of claim 11, wherein the training of the plurality of machine learning models is repeated one or more times until the generated ranks and the known ranks for the plurality of items are within a threshold distance.

15. The computer-implemented method of claim 11, wherein each model includes a single node with Sigmoid function.

16. The computer-implemented method of claim 15, wherein each model is trained using supervised learning.

17. The computer-implemented method of claim 11, wherein adjusting the at least one model parameter includes adjusting a weight of a node of the model.

18. The computer-implemented method of claim 11, wherein the plurality of feature values of the input feature vector comprise at least one of:
item value;
item price;
item type;
item revenue; or item appearance.

19. A system comprising:
a memory with instructions stored thereon; and
a processor, coupled to the memory, the processor operable to access the memory and execute the instructions, wherein the instructions cause the processor to perform operations comprising:
obtaining user data for a plurality of users of an online gaming platform, the user data including user profile data and behavioral parameters;
applying a clustering algorithm to the user data to obtain a plurality of clusters, wherein each cluster includes one or more of the plurality of users, wherein each cluster includes groups of users sharing a subset of one or more of the user profile data and the behavioral parameters, and wherein no user is in more than one cluster; and
training a plurality of machine learning models, wherein each model corresponds to a respective cluster of the plurality of clusters as its cluster-specific machine learning model, wherein the plurality of machine learning models have a same model structure, wherein no cluster- specific machine learning model corresponds to more than one cluster, and wherein the training includes, for each model:
providing an input feature vector that includes a plurality of default feature values for each item of a plurality of items, wherein the default feature values include user preferences for items of the plurality of items, and wherein the default feature values are the same among users of the online gaming platform;
obtaining an output feature vector wherein the output feature vector includes a modified value that modifies each of the plurality of default feature values for each item in the output feature vector;
generating a rank for each item based on the output feature vectors; and adjusting at least one model parameter of the model based on comparison of the generated rank with a known rank for each item.

20. A non-transitory computer-readable medium with instructions stored thereon that, responsive to execution by a processing device, causes the processing device to perform operations comprising:

receiving, from a user, a request for a list of items available on an online gaming platform;

identifying a particular cluster-specific trained machine learning model from a plurality of trained machine learning models based at least in part on user data associated with the user, wherein the user data includes user profile data and behavioral parameters, wherein each model of the plurality of trained machine learning models corresponds with a respective cluster as its cluster-specific machine learning model, wherein each cluster includes groups of users sharing a subset of one or more of the user profile data and the behavioral parameters, wherein no user is in more than one cluster, and wherein no cluster-specific trained machine learning model corresponds to more than one cluster;

providing an input feature vector to the particular cluster-specific trained machine learning model, wherein the input feature vector includes a plurality of default feature values for each item of a plurality of items, wherein the default feature values include user preferences for items of the plurality of items, and wherein the default feature values are common among users of the online gaming platform and common with a search function of the online gaming platform;

obtaining an output feature vector from the particular cluster-specific trained machine learning model, wherein the output feature vector includes a modified feature value that modifies each of the plurality of default feature values for each item in the output feature vector;

assigning, using the search function, a rank for each of the plurality of items based on the output feature vector;

generating, using the search function, the list of items, wherein items in the list of items are ordered based on respective ranks; and providing a user interface to the user that includes the list of items.

\* \* \* \* \*